(12) United States Patent
Kalender et al.

(10) Patent No.: US 9,387,614 B2
(45) Date of Patent: Jul. 12, 2016

(54) METHOD FOR REMOVING INJECTION-MOLDED ITEMS

(75) Inventors: Tomas Kalender, Wolfpassing (AT); Johannes Rella, Payerbach (AT); Duane Royce, Torrington, CT (US)

(73) Assignee: WITTMANN KUNSTSTOFFGERAETE GMBH, Vienna (AT)

( * ) Notice: Subject to any disclaimer, the term of this patent is extended or adjusted under 35 U.S.C. 154(b) by 515 days.

(21) Appl. No.: 13/642,730

(22) PCT Filed: Apr. 20, 2011

(86) PCT No.: PCT/AT2011/000195
§ 371 (c)(1),
(2), (4) Date: Oct. 22, 2012

(87) PCT Pub. No.: WO2011/130761
PCT Pub. Date: Oct. 27, 2011

(65) Prior Publication Data
US 2013/0041503 A1 Feb. 14, 2013

(30) Foreign Application Priority Data
Apr. 23, 2010 (AT) .................................. A 679/2010

(51) Int. Cl.
*G06F 19/00* (2011.01)
*B29C 45/42* (2006.01)
*B29C 45/76* (2006.01)

(52) U.S. Cl.
CPC ............. *B29C 45/42* (2013.01); *B29C 45/7626* (2013.01); *B29C 2045/4275* (2013.01)

(58) Field of Classification Search
CPC ............ B29C 2045/7633; B29C 45/42; B29C 45/7626; B29C 45/76; B29C 2045/4275; G05B 2219/45244; G05B 19/41825

USPC .......................................................... 700/245
See application file for complete search history.

(56) References Cited

U.S. PATENT DOCUMENTS 4,285,649 A * 8/1981 Jonte .................... B29C 45/7626
264/40.1
4,823,274 A * 4/1989 Kiya ....................... B29C 45/76
700/203

(Continued)

FOREIGN PATENT DOCUMENTS

DE 40 03 372 7/1991
DE 41 10 948 10/1992

(Continued)

OTHER PUBLICATIONS

Austrian Search Report conducted in counterpart Austrian Appln. No. A 679/2010 (Aug. 3, 2011).

*Primary Examiner* — Khoi Tran
*Assistant Examiner* — Harry Oh
(74) *Attorney, Agent, or Firm* — Greenblum & Bernstein, P.L.C.

(57) ABSTRACT

Method for removing injection-molded items from an injection-molding machine via a robot and device for performing method. The injection-molding machine and the robot each having a separate drive, and each drive is acted on by a separate open- and closed-loop control unit that is separately programmable. At least the open- and closed-loop control unit of the robot contains a computing element, and the injection-molding machine is equipped with at least one signaling device for detecting a position of the mold. The method includes applying a signal of the signaling device to the open- and closed-loop control unit of the robot, recalculating a motion sequence of the robot based of the open- and closed-loop control unit after each removal cycle, and for each next removal cycle, moving the robot from a start position by a timer at a recalculated start time.

19 Claims, 1 Drawing Sheet

(56) References Cited

U.S. PATENT DOCUMENTS

| | | | | |
|---|---|---|---|---|
| 4,868,472 | A * | 9/1989 | Daggett | 318/568.2 |
| 5,234,328 | A * | 8/1993 | Willson | B29C 45/42 264/334 |
| 5,250,239 | A * | 10/1993 | Herbst | B29C 45/42 264/334 |
| 5,629,031 | A * | 5/1997 | Ishikawa | B29C 45/42 264/334 |
| 5,709,833 | A * | 1/1998 | Simone | B29C 33/44 264/328.1 |
| 6,128,548 | A * | 10/2000 | Wideman et al. | 700/197 |
| 6,230,078 | B1 * | 5/2001 | Ruff | 700/247 |
| 6,315,543 | B1 * | 11/2001 | Lausenhammer | B29C 45/42 264/334 |
| 6,322,733 | B1 * | 11/2001 | Herbst | B23Q 1/26 264/334 |
| 6,325,955 | B1 | 12/2001 | Herbst | |
| 6,432,334 | B1 * | 8/2002 | Keller | B29C 43/50 264/328.1 |
| 6,532,397 | B1 * | 3/2003 | Yamamoto | B29C 37/0007 29/848 |
| 2002/0051833 | A1 * | 5/2002 | Shiozaki | B29C 45/7626 425/139 |
| 2004/0005372 | A1 * | 1/2004 | Shirahata | B25J 9/1676 425/135 |
| 2004/0142056 | A1 * | 7/2004 | Watanabe | B29C 45/50 425/145 |
| 2006/0068049 | A1 * | 3/2006 | Nishizawa | B29C 45/76 425/145 |
| 2006/0161291 | A1 * | 7/2006 | Ikeda | B29C 45/7626 700/200 |
| 2008/0211126 | A1 * | 9/2008 | Kobayashi | B29C 45/7653 264/40.5 |
| 2009/0148553 | A1 * | 6/2009 | Sawada | B29C 45/1639 425/575 |
| 2009/0216375 | A1 * | 8/2009 | Audibert | G05B 19/41825 700/262 |

FOREIGN PATENT DOCUMENTS

| | | |
|---|---|---|
| DE | 197 16 777 | 10/1998 |
| DE | 199 38 234 | 12/2000 |
| EP | 1 057 607 | 12/2000 |
| JP | 2002-172660 | 6/2002 |
| WO | 91/11313 | 8/1991 |

* cited by examiner

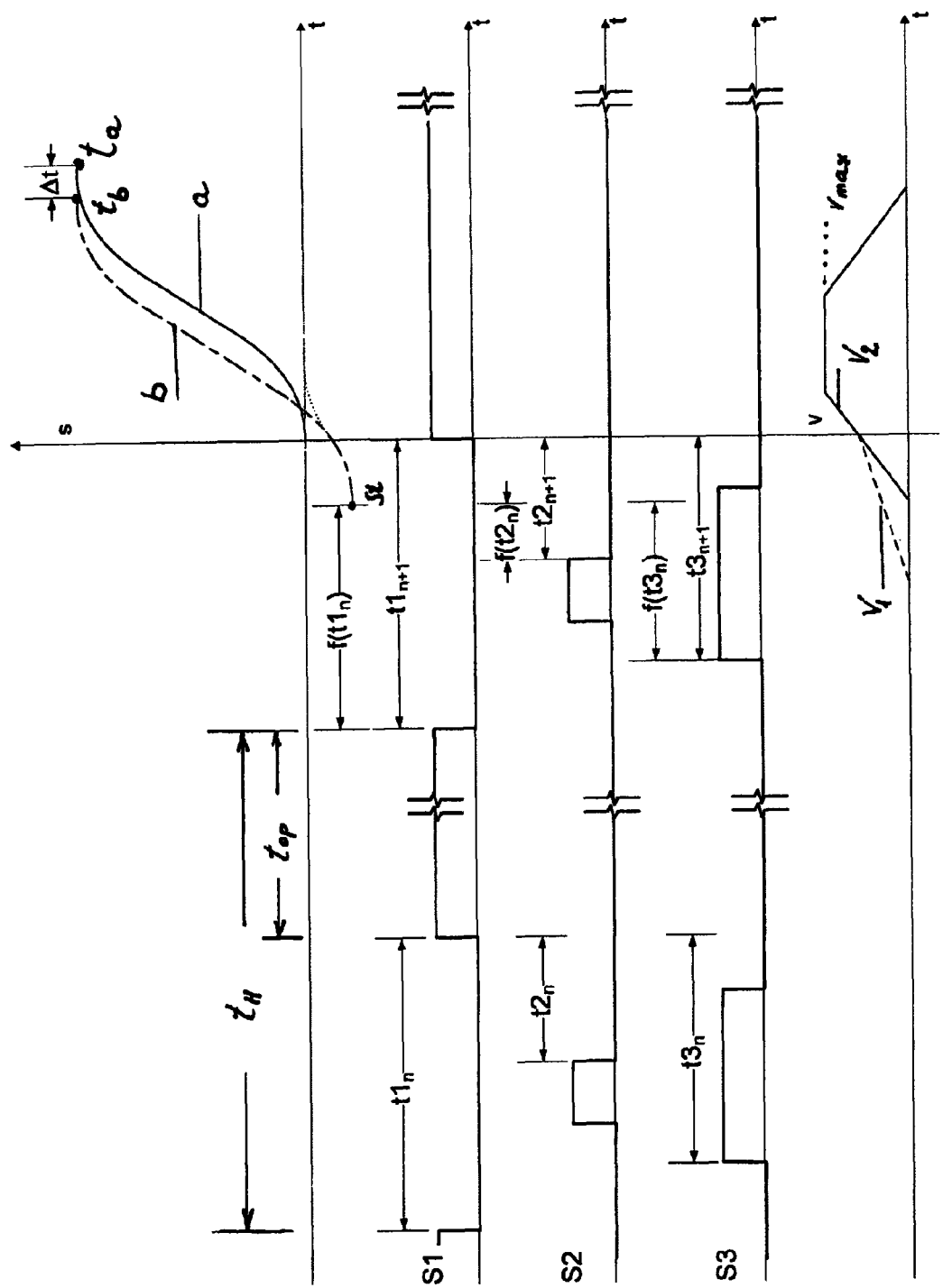

METHOD FOR REMOVING INJECTION-MOLDED ITEMS

CROSS-REFERENCE TO RELATED APPLICATIONS

The present application is a U.S. National Stage of International Patent Application No. PCT/AT2011/000195 filed Apr. 20, 2011, and claims priority under 35 U.S.C. §§119 and 365 of Austrian Patent Application No. A 679/2010 filed Apr. 23, 2010.

BACKGROUND OF THE INVENTION

1. Field of the Invention

The invention relates to a method for removing injection-molded items from an injection-molding machine by a robot. The injection-molding machine and the robot are each provided with a separate drive, and each drive can be acted on by a separate open- and closed-loop control unit that can be programmed separately. The injection-molding machine is equipped with at least one signaling device for detecting a position of the mold.

2. Discussion of Background Information

It is in the nature of things that the production time for the production of injection-molded items should be shortened. One approach for reducing the cycle time was to equip the removal axes of the robots with massive drives, power transmissions and base structures, in order to achieve high speeds or accelerations. In pursuance of this way, it showed that these fast robots never reach their theoretically calculated speeds at relatively short axis paths, as they already have to decelerate again after a short acceleration phase in order to reach the target position. To compensate these conditions, the acceleration values must be set to a very high level, which results in a massive and expensive design.

There are also factors aside from the robot that influence the unproductive time, such as the speed of the ejector, the opening time of the machine, signal transmission or the like.

Thus, a method and apparatus for controlling the movements of an injection-mold and a handling device are known from DE 40 03 372 C1. In order to control the opening and closing movement of an injection-mold and the feed and extraction movement of a handling device for the removal of the molding in a concerted manner, the opening movement of the mold and/or the extraction movement of the handling device is detected in relation to position and speed. The disadvantage thereby is the higher cost in hardware parts.

In addition, a method for removal of injection-molded items from an injection-molding machine using a handling robot is known from DE 41 10 948 C2, wherein both the injection-molding machine and the handling robot are each provided with a separate drive that can be acted on by a separate open- and closed-loop control unit that can be programmed separately. At least the injection-molding machine is equipped with at least one displacement sensor to control the process. Also in this case, the high cost of components is a disadvantage.

Furthermore, a method for demolding a molded part as well as a device for carrying out the process is known from WO 91/11313. According to the method, the molded part is moved to an intermediate position in a first partial movement at low speed, then to the final position in a second partial movement at higher speed. For this purpose, the injection-mold has pressure operated stops which act on the front face of an ejection plate. A high component cost is also required for this design.

Finally, a method for operating a handling unit on a plastics processing machine is also known from DE 197 16 777 C2. The disadvantage of this method, however, is movement interruptions in the movement of the robot in borderline cases when the permissible areas are left marginally.

SUMMARY OF THE EMBODIMENTS

Embodiments of the present invention avoid the mentioned disadvantages, and minimize the unproductive time in the course of a production cycle, in particular for the uninterrupted period of the operating time of the injection-mold machine.

The method in accordance with the invention is characterized in that the signal of the signaling device is applied to the open- and closed-loop control unit of the robot. The open- and closed-loop control unit contains a computing element, in which, the motion sequence of the robot specified by the open- and closed-loop control unit is recalculated after each removal cycle according to the edge, preferably the negative edge, of said signal and the robot is moved from the start position of the robot for the next removal cycle by a timer, which is based on the recalculated start time. With this invention, it is for the first time possible to consider all time-relevant processes in parallel and in an anticipatory way, regardless of whether they take place on the part of the robot or on the part of the injection-molding machine. In exchange with the open- and closed-loop control unit of the injection-molding machine, an optimal removal process is recalculated and the start of the robot redefined after each production cycle.

For the first start of the injection-molding machine, the operator merely has to define the start position of the robot and the removal position for handover of the injection-molded item in the programming stored in the open- and closed-loop control unit. In accordance with today's standard, these positions are entered by so-called "teaching" of the programming. The optimal path movement or motion sequence of the robot is calculated by the open- and closed-loop control unit. If the injection-molding system, i.e., the injection-molding machine and the robot, has started in automatic cycle, multiple processes for optimization of the removal time run automatically and are monitored permanently and readjusted again and again in accordance with the invention.

The open- and closed-loop control unit calculates when the mold will open the next time from the first and subsequently from the previous cycle and starts the movement of the robot before the signal for the open mold arrives.

The synchronization with the ejectors works in the same way. Based on the previous measurement, the open- and closed-loop control unit sets the ejector signal before the removal position is reached, in order to take over the injection-molded item when the removal position is reached without having to wait for the ejectors. The optimal time for giving the injection-molding machine the signal to close the mold is calculated in an equivalent way, even before the robot has moved out completely from the area of the mold.

Thus, the surprising advantage of the method in accordance with the invention must be viewed in that the delay times resulting from the transmission are eliminated from the process. By using the method in accordance with the invention, savings preferably in the amount of 10% of the total time are possible, which signifies an increase in productivity of the same scale.

In accordance with a special embodiment of the invention, the signaling device gives a signal for detecting the mold-open position and, where applicable, another signaling device gives a signal for detecting the mold-closed position. Depending on the type of injection-molding machine, it is equipped with at least one signaling device. Said signaling device serves for clear detection of the mold-open position and is provided in practically all types of machines. Moreover, many types of machines comprise another signaling device for the mold-closed position. The method can principally be used for both types of machines.

In accordance with a special feature of the invention, the time, that is the time of a cycle for production of an injection-molded item minus the time of the mold in the mold-open position, is measured by a time-measuring element of the open- and closed-loop control unit of the robot and this time period is stored in the open- and closed-loop control unit of the robot where applicable. Particularly in the case of a machine type with just one signaling device, namely for the signal of the mold-open position, recording of the time of the mold in the non-open position has crystallized to be most expedient for calculation of the motion sequence of a production cycle. This time period takes practically all variable dimensions in the sequence into account. However, it would be absolutely conceivable that the calculation is based on other times, as explained later.

In accordance with another special feature of the invention, the timer for the start of the robot for the next removal cycle is set to zero in the open- and closed-loop control unit by the edge, in particular the negative edge, of the signal of the mold-open position. This way, the open- and closed-loop control unit of the robot and with that the motion sequence only depends on the one signal of the open- and closed-loop control unit of the injection-molding machine. No additional component cost is required for the open- and closed-loop control process of the injection-molding system.

Since practically all injection-molding machines belonging to the state of the art comprise a signaling device of this type, retrofitting is also possible at any time.

In accordance with a further embodiment of the invention, the calculation for the start of the robot for the next removal cycle is made in the open- and closed-loop control unit after measurement of the time, preferably by the edge, in particular by the positive edge, of the signal of the mold-open position, and the timer is programmed using this time. As a result, synchronization of the motion sequences of the injection-molding machine and the robot is ensured by the one single, namely that of the mold-open position.

In the case of a machine type with at least two signaling devices, namely one for the mold-open position and one for the mold-closed position, the time, that is the time from the negative edge of the signal of the mold-closed position up to the positive edge of the signal of the mold-open position, is measured in accordance with a feature of the invention by a time-measuring element of the open- and closed-loop control unit of the robot and said time period is stored in the closed-loop control unit of the robot where applicable. As already shown above, the invention can also be used for a machine of this type.

With regard to this type of machine, the timer for the start of the robot for the next removal cycle is set to zero in the open- and closed-loop control unit by the edge, in particular the negative edge, of the signal of the mold-open position. This way, the open- and closed-loop control unit of the robot and with that the motion sequence depends on two signals of the injection-molding machine. Since many injection-molding machine designs already comprise at least two signaling devices, this process step does not signify any cost in additional components.

In accordance with the fundamental inventive idea, the calculation for the start of the robot for the next removal cycle is made in accordance with a feature of the invention in the open- and closed-loop control unit after measurement of the time, preferably by the edge, in particular by the positive edge, of the signal of the mold-open position, and the timer is programmed using this time. The advantages of this further embodiment have been shown already.

If it is determined from the results from the calculation that the robot would have to start earlier than the zeroizing edge is given, the time measurement is related to the positive edge of the signal of the mold-closed position. In accordance with a further embodiment of the invention, the time, that is in this case the time from the positive edge of the signal of the mold-closed position up to the positive edge of the signal of the mold-open position, is measured by a time-measuring element of the open- and closed-loop control unit of the robot and said time period is stored in the open- and closed-loop control unit of the robot where applicable. As a result, no calculation process is skipped.

In accordance with a relevant embodiment of the invention, the timer for the start of the robot for the next removal cycle is set to zero in the open- and closed-loop control unit by the edge, in particular the negative edge, of the signal of the mold-open position.

In accordance with another embodiment of the invention, the calculation for the start of the robot for the next removal cycle is made in the open- and closed-loop control unit after measurement of the time, preferably by the edge, in particular by the positive edge, of the signal of the mold-open position, and the timer is programmed using this time. As already mentioned, continuous calculation of each cycle is ensured this way.

In accordance with a special feature of the invention, the signal of the mold-open position is given to the open- and closed-loop control unit of the robot during the starting motion of the robot into the mold in accordance with the path of deceleration up to entry of the robot into the area of the mold. This way, it is ensured that absolutely no malfunctions can occur in the motion sequence of the robot, such as for example a feed movement when the mold is not opened yet. If the mentioned signal is not given at the relevant time, the robot is decelerated and stops before the area of the mold.

In accordance with another feature of the invention, the basic structural parameters of the robot, such as for example accelerating and stopping power as well as maximum speed, are included in the recalculation of the start time of the robot. By including these factors, the method can be used individually and for practically all types of injection-molding machines.

In accordance with a special embodiment of the invention, at least two different accelerations in the motion sequence of a production cycle for the robot are included in the recalculation of the start time. This embodiment is based on the fact that robots are optimized correctly and in concrete for fast removal by programmers and the maximum values of acceleration and speed are predefined. Thereby, standstill times of the robot may occur before each removal cycle. To protect the robot in the long term, it is therefore recommended that the speed outside of the mold be reduced to such an extent that the standstill time is reduced to a minimum for the next cycle. The motion takes place at maximum speed within the area of the mold.

Embodiments of the invention are directed to a device for realizing or performing the method described above.

In device for the method in accordance with the invention, the injection-molding machine is equipped with at least one signaling device for detecting the mold-open position. The open- and closed-loop control unit of the robot comprises at least a computing element, a time-measuring element and a timer and the signaling device or devices of the injection-molding machine are connected with the open- and closed-loop control unit of the robot. As already presented in the explanations of the method, the advantages illustrated already are to be realized using the device in accordance with the invention.

Embodiments of the instant invention are directed to a method for removing injection-molded items from an injection-molding machine via a robot. The injection-molding machine and the robot each having a separate drive, and each drive is acted on by a separate open- and closed-loop control unit that is separately programmable. At least the open- and closed-loop control unit of the robot contains a computing element, and the injection-molding machine is equipped with at least one signaling device for detecting a position of the mold. The method includes applying a signal of the signaling device to the open- and closed-loop control unit of the robot, recalculating a motion sequence of the robot based of the open- and closed-loop control unit after each removal cycle, and for each next removal cycle, moving the robot from a start position by a timer at a recalculated start time.

According to embodiment, an end of the removal cycle is indicated by an edge of the signal. Further, the edge of the signal is a negative edge. Alternatively, the edge of the signal is a positive edge.

In accordance with other embodiments, the signaling device can transmit a single signal for detecting the mold-open position and for detecting the mold-closed position.

In embodiments, the open- and closed-loop control unit of the robot can include a time-measuring element, and the method may further include measuring a time period that is a time of a cycle for production of an injection-molded item minus a time of the mold in the mold-open position with the time-measuring element. The method can also include storing the measured time period is stored in the open- and closed-loop control unit of the robot.

The method may also include setting the timer for the start of the robot for the next removal cycle to zero in the open- and closed-loop control unit based on a mold-open edge of the signal.

In other embodiments, after measuring the time period, the method can include calculating in the open- and closed-loop control unit of the robot a time delay $f(t1n)$ for the start of the robot for the next removal cycle, and programming the timer with the calculated time delay.

According to still other embodiments of the invention, the signaling device may transmit a signal for detecting the mold-open position and another signaling device transmits gives another signal for detecting the mold-closed position. The open- and closed-loop control unit of the robot can include a time-measuring element, and the method may include measuring a time period that is a time from a negative edge of the signal for detecting the mold-closed position up to a positive edge of the signal for detecting the mold-open position with the time-measuring element, and storing the measured time period in the open- and closed-loop control unit of the robot. Further, the method can include setting the timer for the start of the robot for the next removal cycle to zero in the open- and closed-loop at an edge of the signal for detecting the mold-closed position. After measuring the time period at the positive edge of signal for detecting the mold-open position, the method can include calculating in the open- and closed-loop control unit of the robot a time delay for the start of the robot for the next removal cycle, and programming the timer with the calculated time delay. Moreover, the open- and closed-loop control unit of the robot can include a time-measuring element, and the method can include measuring a time period that is a time from a positive edge of the signal for detecting the mold-closed position up to a positive edge of the signal for detecting the mold-open position by the time-measuring element, and storing the measured time period in the open- and closed-loop control unit of the robot. The method can also include setting the timer for the start of the robot for the next removal cycle to zero in the open- and closed-loop control unit by an edge the signal for detecting of the mold-closed position. Further, after measuring the time period at the positive edge of signal for detecting the mold-open position, the method can include calculating in the open- and closed-loop control unit of the robot a time delay for the start of the robot for the next removal cycle, and programming the timer with the time delay.

In accordance with still other embodiments of the invention, the signal of the mold-open position can be transmitted to the open- and closed-loop control unit of the robot during a starting motion of the robot into the mold along a path of deceleration to entry of the robot into an area of the mold.

According to other embodiments, basic structural parameters of the robot including at least one of acceleration, stopping power, and maximum speed, are considered in determining the recalculated start time.

Further, at least two different accelerations in the motion sequence of a production cycle for the robot may be included in determining the recalculated start time.

In accordance with still yet other embodiments of the present invention, a device for performing the above-described method includes an injection-molding machine including at least one signaling device for detecting a position of the mold, a robot including an open- and closed-loop control unit that includes at least a computing element, a time-measuring element and the timer, and the at least one signaling device being connectable to the open- and closed-loop control unit of the robot.

BRIEF DESCRIPTION OF THE DRAWINGS

The invention will now be explained in more detail based on an embodiment which is illustrated in the drawing.

The FIGURE shows a diagram of the path of the robot as well the signals over time.

DETAILED DESCRIPTION OF THE EMBODIMENTS

In the FIGURE, time is shown on the horizontal axes of the diagram.

For removing injection-molded items from an injection-molding machine with a robot, the injection-molding machine and the robot are each provided with a separate drive, and each drive can be acted on by a separate open- and closed-loop control unit that can be programmed separately. Further, the injection-molding machine is equipped with at least one signaling device for detecting a position of the mold.

The injection-molding machine is thus equipped with at least one signaling device for detecting a position of the mold. Furthermore, the open- and closed-loop control unit of the robot comprises at least a computing element, a time-measuring element and a timer. The signaling devices of the injection-molding machine are connected with the open- and closed-loop control unit of the robot.

A conventional robot usually starts its motion sequence "a" at the time of the positive edge of a signal S1 of the mold-open position and covers or traverses the path to the removal position in the mold at an acceleration or speed that is predefined by the open- and closed-loop control unit. The robot reaches the removal position at the time $t_a$.

Embodiments of the inventive method shorten the time period from the positive edge of the signal S1 of the mold-open position up to the time the robot reaches the removal position, thus accelerating the time $t_a$. This way, a savings in the total time for a production cycle is possible, and an increase in productivity is given or achieved. The method is achieved by starting the robot before the positive edge of the signal S1 of the mold-open position. In order to now be able to define this accelerated start time St arithmetically, solely for a machine type with only one signaling device, namely the signal S1 of the mold-open position, this signal S1 is processed in the open- and closed-loop control unit of the robot.

The signal S1 of the signaling device is applied to the open- and closed-loop control unit of the robot. The open- and closed-loop control unit of the robot contains a computing element, whereby the motion sequence "b" of the robot specified by the open- and closed-loop control unit is recalculated after each removal cycle according to the edge, preferably the negative edge, of signal S1. The robot is moved from a start position of the robot for the next removal cycle by a timer, which is based on the recalculated start time St. Hence, the robot moves according to its motion sequence "b" and reaches its removal position at the time $t_b$. It is thus illustrated graphically that a time savings Δt is achieved.

The time $t1_n$, which is the time $t_H$ of a cycle for production of an injection-molded item minus the time $t_{Op}$ of the mold in the mold-open position, is measured by a time-measuring element of the open- and closed-loop control unit of the robot. The time period $t1_n$ is stored in the open- and closed-loop control unit of the robot. Furthermore, the timer for the start of the robot for the next removal cycle is set to zero in the open- and closed-loop control unit by the edge, in particular the negative edge, of the signal S1 of the mold-open position. The calculation $f(t1_n)$ for the start of the robot for the next removal cycle is made in the open- and closed-loop control unit after measurement of the time $t1_n$, preferably by the edge, in particular by the positive edge, of the signal S1 of the mold-open position, and the timer is programmed using this time.

The equivalent procedure is used for the next production cycle. Thus, the time period $t1_{n+1}$ is measured using the time-measuring element and processed accordingly.

It was mentioned already that there are also types of injection-molding machines which comprise two signaling devices. Thus, this type of machine comprises a signaling device with a signal S1 for detecting the mold-open position and another signaling device with a signal S2 or S3 for detecting the mold-closed position. In such a case, it has proved to be expedient to feed both signals S1 and S2 or S1 and S3 to the open- and closed-loop control unit of the robot.

In this case, the time $t2_n$, which is the time from the negative edge of the signal S2 of the mold-closed position up to the positive edge of the signal S1 of the mold-open position, is measured by a time-measuring element of the open- and closed-loop control unit of the robot. This time period $t2_n$ is stored in the open- and closed-loop control unit of the robot. The timer for the start of the robot for the next removal cycle is set to zero in the open- and closed-loop control unit by the edge, in particular the negative edge, of the signal S2 of the mold-closed position. Furthermore, the calculation $f(t2_n)$ for the start of the robot for the next removal cycle is made in the open- and closed-loop control unit after measurement of the time $t2_n$, preferably by the edge, in particular by the positive edge, of the signal S1 of the mold-open position, and the timer is programmed using this time.

It may result from the calculation that the robot would have to start earlier than the zeroizing (or negative) edge of the mold-closed position is given. Even in this situation, an embodiment of the method can also be used so that the time measurement is related to the positive edge of the signal S3 of the mold-closed position. According to this embodiment, the time $t3_n$, which is the time from the positive edge of the signal S3 of the mold-closed position up to the positive edge of the signal S1 of the mold-open position, is measured. The time $t3_n$ is measured by a time-measuring element of the open- and closed-loop control unit of the robot. The following process steps correspond with the steps explained above.

To ensure operational safety, the following further embodiment of the method is of extraordinary importance. The signal S1 of the mold-open position must be given to the open- and closed-loop control unit of the robot during the starting motion of the robot into the mold in accordance with the path of deceleration up to entry of the robot into the area of the mold. This measure is shown graphically in the lowest diagram in the FIGURE by showing the speed v of the robot over the time. If the signal S1 of the mold-open position does not arrive, the robot must be decelerated, namely in such a way that it does not enter into the area of the mold. As a result, any damage of the mold or the injection-molding machine is prevented.

Of course, the basic structural parameters of the robot, such as for example accelerating and stopping power as well as maximum speed, are included in the recalculation of the start time of the robot.

In another embodiment of the invention, at least two different accelerations in the motion sequence of a production cycle for the robot are included in the recalculation of the start time. Thus, for example, the acceleration for the robot immediately after its start is selected in such a way that it is moved at a minor speed increase $v_1$ up to arrival of the signal S1 and not accelerated to its maximum speed $v_{max}$ at the speed increase $v_2$ until after this time.

Accelerations for the return of the robot, that is, after leaving the removal position, could also be specified in equivalence to these acceleration specifications.

The calculation is explained only to some extent. Viewed over the total period, the time of the next start of the robot thus results:

$$T\_start\_movement\_profile_{n+1} := T\_close_n + f(t1_n) =$$
$$T\_close_n + t1_n - t\_prestart = T\_close_n + t1_n - \frac{a\_break \; vmax}{(a\_brake + a\_pos) \; a\_pos}$$

whereby the terms in the formula mean:
T_start_movement_profile[n+1] . . . time at which the robot will start its motion sequence b the $(n+1)^{th}$ (next) time;
T_close[n] . . . time of the $n^{th}$ beginning of the closing movement of the mold (negative edge of the signal S1 of the mold-open position);
T1$_n$ . . . time period according to FIGURE;
t_prestart . . . time period by which the motion sequence b is started earlier in this method than in conventional systems;
a_pos . . . accelerating power (=maximum structural acceleration) of the robot involved in the removal movement;
a_brake . . . stopping power (=maximum structural deceleration) of the robot involved in the removal movement; and
vmax . . . maximum structural speed of the robot involved in the removal movement

The invention claimed is:

1. A method for removing injection-molded items from a mold of an injection-molding machine via a robot, the injection-molding machine and the robot each having a separate drive, and each drive being acted on by a separate open- and closed-loop control unit that is separately programmable, at least the open- and closed-loop control unit of the robot contains a computing element, and the injection-molding machine being equipped with at least one signaling device for signaling a detected position of the mold, the method comprising:

applying a signal of the signaling device to the open- and closed-loop control unit of the robot;
recalculating a motion sequence of the robot based on the open- and closed-loop control unit of the robot after each removal cycle; and
for each next removal cycle, moving the robot from a start position at a recalculated start time determined by a timer,
wherein the open- and closed-loop control unit of the robot further comprises a time-measuring element, and the method further comprises measuring a time period that is a time from a negative edge of the signal for detecting the mold-closed position up to a positive edge of the signal for detecting the mold-open position with the time-measuring element; and
storing the measured time period in the open- and closed-loop control unit of the robot.

2. The method in accordance with claim 1, wherein an end of the removal cycle is indicated by an edge of the signal.

3. The method in accordance with claim 2, wherein the edge of the signal is a negative edge.

4. The method in accordance with claim 2, wherein the edge of the signal is a positive edge.

5. The method in accordance with claim 1, wherein the signaling device transmits a single signal for detecting the mold-open position and for detecting the mold-closed position.

6. The method in accordance with claim 1, wherein the signaling device transmits a signal for detecting the mold-open position and another signaling device transmits another signal for detecting the mold-closed position.

7. The method in accordance with claim 1, wherein the open- and closed-loop control unit of the robot further comprises a time-measuring element, and the method further comprises measuring a time period that is a time of a cycle for production of an injection-molded item minus a time of the mold in the mold-open position with the time-measuring element.

8. The method in accordance with claim 7, further comprising storing the measured time period in the open- and closed-loop control unit of the robot.

9. The method in accordance with claim 1, further comprising setting the timer for the start of the robot for the next removal cycle to zero in the open- and closed-loop control unit based on a mold-open edge of the signal.

10. The method in accordance with claim 1, wherein, after measuring the time period, the method further comprises calculating in the open- and closed-loop control unit of the robot a time delay for the start of the robot for the next removal cycle; and
programming the timer with the calculated time delay.

11. The method in accordance with claim 1, further comprising setting the timer for the start of the robot for the next removal cycle to zero in the open- and closed-loop at an edge of the signal for detecting the mold-closed position.

12. The method in accordance with claim 1, wherein, after measuring the time period at the positive edge of signal for detecting the mold-open position, the method further comprises calculating in the open- and closed-loop control unit of the robot a time delay for the start of the robot for the next removal cycle; and
programming the timer with the calculated time delay.

13. A method for removing injection-molded items from an injection-molding machine via a robot, the injection-molding machine and the robot each having a separate drive, and each drive being acted on by a separate open- and closed-loop control unit that is separately programmable, at least the open- and closed-loop control unit of the robot contains a computing element, and the injection-molding machine being equipped with at least one signaling device for signaling a detected position of the mold, the method comprising:

applying a signal of the signaling device to the open- and closed-loop control unit of the robot;
recalculating a motion sequence of the robot based on the open- and closed-loop control unit of the robot after each removal cycle; and
for each next removal cycle, moving the robot from a start position at a recalculated start time determined by a timer,
wherein the signaling device transmits a signal for detecting the mold-open position and another signaling device transmits another signal for detecting the mold-closed position,
wherein the open- and closed-loop control unit of the robot further comprises a time-measuring element, and the method further comprises measuring a time period that is a time from a positive edge of the signal for detecting the mold-closed position up to a positive edge of the signal for detecting the mold-open position by the time-measuring element; and
storing the measured time period in the open- and closed-loop control unit of the robot.

14. The method in accordance with claim 13, further comprising setting the timer for the start of the robot for the next removal cycle to zero in the open- and closed-loop control unit using an edge of the signal for detecting the mold-closed position.

15. The method in accordance with claim 13, wherein, after measuring the time period at the positive edge of signal for detecting the mold-open position, the method further comprises calculating in the open- and closed-loop control unit of the robot a time delay for the start of the robot for the next removal cycle; and
programming the timer with the time delay.

16. The method in accordance with claim 1, wherein the signal of the mold-open position is transmitted to the open- and closed-loop control unit of the robot during a starting motion of the robot toward the mold along a path of deceleration to enter into an area of the mold.

17. The method in accordance with claim 1, wherein basic parameters of the robot comprising at least one of acceleration, stopping power, and maximum speed, are considered in determining the recalculated start time.

18. The method in accordance with claim 1, wherein at least two different accelerations in the motion sequence of a production cycle for the robot are included in determining the recalculated start time.

19. A device for performing a method of removing injection-molded items from a mold of an injection-molding machine via a robot, the method comprising applying a signal of a signaling device to the open- and closed-loop control unit of a robot, recalculating a motion sequence of the robot based on the open- and closed-loop control unit of the robot after each removal cycle; for each next removal cycle, moving the robot from a start position at a recalculated start time determined by a timer, measuring a time period that is a time from a negative edge of the signal for detecting the mold-closed position up to a positive edge of the signal for detecting the mold-open position with the time-measuring element; and storing the measured time period in the open- and closed-loop control unit of the robot the device comprising:

the robot;

the injection-molding machine, wherein the injection-molding machine and the robot each have a separate drive, and each drive being acted on by a separate open- and closed-loop control unit that is separately programmable;

the injection-molding machine comprising at least one signaling device for signaling a detected position of the mold to the open- and closed-loop control unit of the robot;

the open- and closed-loop control unit of the robot having at least a computing element, the time-measuring element for measuring the time period that is the time from the negative edge of the signal for detecting the mold-closed position up to the positive edge of the signal for detecting the mold-open position, and the timer for recalculating the start time; and the at least one signaling device being connectable to the open- and closed-loop control unit of the robot for applying the signal of the signaling device to the open- and closed-loop control unit of the robot.

* * * * *